US005736592A

United States Patent [19]
DeMeuse et al.

[11] Patent Number: 5,736,592
[45] Date of Patent: Apr. 7, 1998

[54] PROCESS FOR INTRAMOLECULARLY CONDENSING A NON-LINEAR OPTICAL POLYAMIC ACID COMPOSITION

[75] Inventors: Mark Thomas DeMeuse, Robbinsville; Diana Marie Applegate, Toms River; Kwan-Yue Alex Jen, Old Bridge, all of N.J.; John Thomas Kenney, Palo Alto, Calif.

[73] Assignee: Enichem S.p.A., Italy

[21] Appl. No.: 389,114

[22] Filed: Feb. 15, 1995

[51] Int. Cl.$^6$ .......................... C08G 69/26; C08G 73/10; B32B 27/08

[52] U.S. Cl. .......................... 523/137; 252/582; 359/237; 359/242; 359/244; 359/245; 385/122; 428/473.5; 526/259; 526/265; 528/125; 528/126; 528/128; 528/172; 528/176; 528/220; 528/229; 528/353

[58] Field of Search .......................... 523/137; 528/353, 528/125, 126, 128, 172, 173, 176, 220, 229, 350; 526/209, 265; 428/473.5; 385/122; 252/582; 359/237, 242, 244, 245

[56] References Cited

U.S. PATENT DOCUMENTS

| | | | |
|---|---|---|---|
| 4,892,681 | 1/1990 | Miyata et al. | 252/582 |
| 4,894,263 | 1/1990 | Dubois et al. | 428/1 |
| 4,933,112 | 6/1990 | DeMartino et al. | 252/587 |
| 4,935,292 | 6/1990 | Marks et al. | 428/220 |
| 4,984,186 | 1/1991 | Gordon et al. | 252/882 |

FOREIGN PATENT DOCUMENTS

| | | |
|---|---|---|
| 2255336 | 11/1992 | United Kingdom. |
| 2267095 | 11/1993 | United Kingdom. |
| WO 91/03001 | 3/1991 | WIPO. |

OTHER PUBLICATIONS

Kishanprasad et al., Journal of Applied Polymer Science, 50(3), 419–425 (1993).

Wu et al., SPIE, 1560, 196–205 (1991).

Wu et al., Appl. Phys. Lett., 58(3), 225–227 (1991).

Yang et al., Macromolecules, 27(20), 5858–5862 (Sep. 26, 1994).

Kalluri et al., 1994 IEEE Nonlinear Optics: Materials, Fundamentals, and Applications, (IEEE, New York, Jul. 25, 1994), pp. 191–193.

Optoelectronics Sandoz Technical Publication, "Nonlinear Optical Polymers".

Robert D. Rossi, "Polymides", *Engineered Materials Handbook*, vol. 3: Adhesives and Sealants, 151–62 (ASM International, Materials Park, Ohio, 1991).

Nicoud et al, Chapter 11–3, *Nonlinear Optical Properties Of Organic Molecules and Crystals*, vol. 1, (Chemla and Zyss, Eds., Academic Press, Inc., New York 1987), pp. 228–296.

Singer et al., J. Opt. Soc. Am., 6(7), 1339–50 (1989).

Lewis et al., Polymer Preprints, 28(2), 330 (1987).

Primary Examiner—Shelley A. Dodson
Attorney, Agent, or Firm—Lerner, David, Littenberg, Krumholz & Mentlik

[57] ABSTRACT

A process for intramolecularly condensing a polyamic acid composition containing an NLO compound to form a polyimide host matrix composition containing as a guest the NLO compound, which process includes the step of uniformly heating the polyamic acid composition, in the absence of a solvent or diluent, to a temperature at which the intramolecular condensation will occur without thermal degradation of the NLO compound, so that the temperature differential within the polyamic acid is below that which will produce localized thermal degradation temperatures, until the intramolecular condensation of the polyamic acid composition to the polyimide host matrix composition is substantially complete. Polyimide host matrix compositions containing guest NLO compounds prepared by the inventive process are also disclosed, wherein the NLO compounds have external field-induced molecular alignments.

29 Claims, No Drawings

PROCESS FOR INTRAMOLECULARLY CONDENSING A NON-LINEAR OPTICAL POLYAMIC ACID COMPOSITION

BACKGROUND OF THE INVENTION

1. Field of the Invention

The present invention relates to polyamic acids and polyimides prepared therefrom having non-linear optical (NLO) properties. In particular, the present invention relates to the intramolecular condensation of polyamic acid compositions containing NLO compounds to form polyimide host matrix compositions having reduced densification. The polyimide compositions contain as a guest the NLO compound, and the reduced densification provides an advantage in the molecular aligning of the NLO compounds.

The process uniformly heats the polyamic acid composition in the absence of a solvent or diluent to a temperature at which the intramolecular condensation will occur without thermal degradation of the NLO compound. The process maintains a temperature differential below that which will produce localized thermal degradation of the NLO compound. The heating continues until the intramolecular condensation of the polyamic acid composition is substantially complete. Orientation of the NLO compounds within the host matrix produces highly efficient second harmonic generation and electro-optic modulation of an electromagnetic wave having a wavelength between 300 nm and 2000 nm.

2. Description of the Prior Art

Highly efficient NLO materials capable of doubling or tripling the frequency of incident light are currently of great scientific and technological interest. The materials are useful in optical telecommunications, signal processing and the construction of optical computers. Nonlinear optics is concerned with the interaction of electromagnetic fields in various media to produce new fields which may be altered in phase, frequency or amplitude. The NLO effect of a material upon an electromagnetic field is a function of the second and higher order terms of the following equation:

$$P = \alpha E + \beta E^2 + \gamma E^3 + $$

P is the polarization of material, E is the intensity of the electric field, and the coefficients $\alpha$, $\beta$ and $\gamma$, etc., are indicative of the NLO susceptibility of the material. Such coefficients are constant for a given material but vary from material to material. The second harmonic generation properties of a material are a function of the second order coefficient, $\beta$. Second harmonic generation efficiencies increase as the value of $\beta$ increases.

Candidate NLO materials should possess good physical properties, such as high optical transparencies, low dielectric constants and high laser damage thresholds. The material should also possess the molecular nonlinearity required of NLO materials. In particular, high $\beta$ values, fast response times and nonlinear susceptibility over a broad range of wavelengths are required, particularly the wavelengths between about 300 nm and 2,000 nm.

Recent efforts in the development of NLO materials have focused upon non-centrosymmetric organic materials with large delocalized pi-electron systems. Such materials exhibit great nonlinear susceptibilities and can be varied to optimize the desired physical and mechanical properties. The simplest of such compounds are the single benzene ring derivative disclosed by U.S. Pat. No. 4,894,186 to Gordon. Related compounds are derived from two to four benzene rings separated by pi-electron conjugated carbon-carbon, carbon-nitrogen and nitrogen-nitrogen bridges. See, for example, U.S. Pat. No. 4,892,681 to Myata et al., U.S. Pat. No. 4,894,263 to Dubois et al., U.S. Pat. No. 4,933,112 to DeMartino et al. and U.S. Pat. No. 4,935,292 to Marks et al. Five-membered heteroaromatic ring compounds linked by pi-electron conjugated bridges provide increased nonlinear susceptibilities. Such compounds are disclosed by U.S. patent application Ser. No. 07/626,358 filed Dec. 12, 1990. The disclosure of this patent application is hereby incorporated herein by reference thereto.

To induce charge asymmetry, and consequently second order nonlinear polarizability, an aromatic ring at one end of the NLO compound structure is substituted with an electron donating group. On the other end, an aromatic ring is substituted with an electron accepting group. The NLO compound is then combined with a host polymer, followed by dipole alignment of the NLO compound structure.

Pi-electron conjugated bridges linking the aromatic or heteroaromatic rings of NLO compounds are a source of thermal and photochemical instability. This is addressed by copending and commonly owned U.S. patent application Ser. No. 07/930,732 filed Aug. 14, 1992. The disclosure of this patent application is hereby incorporated herein by reference thereto. This application discloses NLO compounds derived from highly conjugated fused ring structures of two or three aromatic or heteroaromatic rings. At least one ring is a five-membered heteroaromatic ring, and pi-electron conjugated bridges are eliminated. This application also discloses NLO compounds derived from one to four non-fused five-membered heteroaromatic rings linked together without pi-conjugated bridges.

The stability of organic NLO compounds in processing solvents and host polymers at processing temperatures is an important parameter in their application in electro-optic devices. High-$T_g$ polyimide polymers are likely to be used in the production of NLO devices. Therefore, candidate NLO materials must survive the stringent processing conditions required to produce stable polyimides.

Most polyimides are coated as an amic acid prepolymer, which, after solvent removal, is thermally converted in a ring-closing reaction to the final polyimide. During this imidization process, the very acidic environment (pH=2), polar processing solvents and by-products formed at high temperatures (150°–200° C.) are very reactive to the NLO compounds. Thus far, molecules that have been inherently stable to approximately 300° C. have not been completely stable in polyamic acids while being cured to polyimides. Many decompose near the $T_g$ of the polymers. This may be caused by the residual polar solvents which complex with amic acid, or by the reactive products formed during the imidization process.

Complicating matters, polyamic acids, and the polyimides derived therefrom, are thermally resistive, that is, the polymers are thermal insulators. The thermally-induced intramolecular condensation produces a wide temperature differential as the polymer is heated. Localized temperatures are produced at which thermal degradation of the NLO compound can occur. This has limited the selection of NLO compounds suitable for use with polyimides and thus has hindered the development of highly efficient NLO polymers.

Lewis et al., *Polymer Preprints*, 28(2), 330 (1987), disclose that the solution imidization reaction times for polyamic acids can be reduced by a factor of 20–40 using microwave heating. Hawley et al., *Proc. 37th Int. SAMPE Symp.*, March, 1992, Anaheim, Calif. p. 328, disclose the microwave processing of solutions of polyimide composites.

Solution polymerizations, however, fail to address the degradation of NLO compounds caused by polar imidization solvents. A solvent-free process by which polyamic acids may be intramolecularly condensed without the development of substantial temperature differentials would be highly desirable.

SUMMARY OF THE INVENTION

This need is met by the present invention. It has now been discovered that the thermal degradation of NLO compounds can be minimized by uniformly heating the polyamic acid in the absence of a solvent or diluent to an intramolecular condensation temperature below that which thermal degradation of the NLO compound occurs. Uniform heating maintains the temperature differential within the polyamic acid below that which will produce localized thermal degradation temperatures.

Therefore, in accordance with the present invention, there is provided a process for intramolecularly condensing a polyamic acid composition containing an NLO compound to form a polyimide host matrix composition containing as a guest the NLO compound, which process includes the step of uniformly heating the polyamic acid composition, in the absence of a solvent or diluent, to a temperature at which the intramolecular condensation will occur without thermal degradation of the NLO compound, so that the temperature differential within the polyamic acid is below that which will produce localized thermal degradation temperatures, until the intramolecular condensation of the polyamic acid composition to the polyimide host matrix composition is substantially complete.

Preferred processes in accordance with the present invention uniformly heat the polyamic acid composition by irradiating the composition with electromagnetic radiation in the microwave or radio frequency range. The dielectric heating produced by the electromagnetic radiation minimizes thermal motion of the polymer by maintaining low kinetic temperatures at the non-reactive sites. Consequently, the polymer remains in the solid state while the intramolecular condensation occurs. Electromagnetic frequencies may be selected at which thermal induction of the intramolecular condensation will occur without heating residual water or solvents present in the polymer to temperatures reactive with the NLO compounds. As a result, the compatibility of the guest NLO compound in the host polymer matrix is improved.

The present invention incorporates the discovery that uniform heating of the polyamic acid composition allows for fine control of the polymer molecular alignment of the resulting polyimide. The uniform heating produces a lower temperature imidization. Because polyimides are considerably less flexible than corresponding polyamic acids and require higher temperatures to densify (reduce free volume), the lower temperature imidized materials are less dense (have greater excess free volume) than polyimides formed at higher temperatures.

The excess free volume of lower temperature imidized polymers allows for more effective electric field alignment during densification poling of NLO compounds in the polymer matrix. Densification eliminates the excess free volume of the polyimide by heating the material to an elevated temperature at which the polymer molecules begin to align with reduced spacing, thereby decreasing the free volume of the polymer material. The temperature above which alignment begins to occur is referred to as the densification temperature.

Densification poling is the alignment of the NLO compound dipoles during a rapid thermal ramp of a cast film of the polyimide composition to a temperature above the densification temperature. The NLO compound dipoles are aligned by application of an intense electric field (0.1–2 MV $cm^{-1}$) during the rapid thermal ramp. At first, thermal expansion of the polymer material increases the free volume. The NLO compound dipoles become aligned when the available free volume is larger than the molecular rotational volume of the NLO compounds. The polyimide composition is held above the densification temperature for a specified time after the polymer molecules align, during which the free volume of the material contracts, that is, it is reduced. Once densification is substantially complete, the material is then cooled.

The densification temperature cycle thus returns the material to room temperature with reduced excess free volume. The contraction of the material locks the aligned dipoles into place, leading to enhanced thermal stability of the aligned system.

Therefore, according to preferred embodiments of the present invention, the process further includes the steps of casting a film of the polyimide composition on a suitable substrate; heating the film to a temperature above the densification temperature while an electric field of intensity sufficient to align the dipoles of the NLO compound is applied to the polyimide film, wherein the rate of heating is selected to allow the NLO compound dipoles to become substantially aligned before the densification temperature is attained; and maintaining the film temperature above the densification temperature at least until the available free volume of the polyimide composition is reduced below the molecular rotational volume of the NLO compound.

Preferred processes uniformly heat the polyimide film so that the temperature differential within the polyimide is below that which will produce localized thermal degradation temperatures. More preferably, the uniform heating is performed by irradiating the film with electromagnetic radiation in the microwave or radio frequency range.

The application of the electric field may be discontinued once the available free volume of the polymer is reduced below the molecular rotational volume of the NLO compound. Preferred processes maintain the application of the electric field until the polymer film has cooled to room temperature in order to ensure the complete contraction of the polyimide and the stable dipole alignment of the NLO compounds.

The degree of densification, as measured by the birefringence of the polyimide may be controlled by varying the absolute temperature above the densification temperature to which the polyimide is heated. The present invention thus allows for control of the free volume of the polyimide and the mating of the molecular volume of candidate NLO compounds with an appropriate free volume of the polymer. This provides ultimate control over the densified state birefringence of the resulting polyimide composition.

The ability to control densified state birefringence minimizes polymer optical attenuation. The optical attenuation of polyimides is caused by scattering from charge transfer regions or domains. These domains form with densification, leading to increased attenuation after high temperature densification. The excess free volume of lower temperature imidized polymers minimizes initial domain formation and the resulting attenuation from high temperature densification, thereby increasing optical transmission.

NLO compounds in accordance with the present invention have the structure represented by Formula I:

D—R—A     (I)

wherein D, R and A form a non-centrosymmetric electron delocalized resonance configuration in which R is a pi-conjugated electron delocalized aromatic ring-containing moiety, A is a ring-substituted electron withdrawing moiety and D is a ring-substituted electron donating moiety.

Alternatively, NLO compounds in accordance with the present invention may have the structure represented by Formula IA:

wherein $D_1$, $D_2$, $R_1$, $R_2$, $A_1$ and $A_2$ form a non-centrosymmetric electron delocalized resonance configuration in which $R_1$ and $R_2$ are independently selected from pi-conjugated electron delocalized aromatic ring-containing moieties, $A_1$ and $A_2$ are independently selected from electron withdrawing moieties and $D_1$ and $D_2$ are independently selected from ring-substituted electron donating moieties.

For either Formula I or Formula IA, R $R_1$ and $R_2$ may contain from one to ten aromatic or heteroaromatic rings or fused ring systems, linked together so as to form a delocalized resonance configuration. Suitable linkages include pi-electron conjugated carbon-carbon, carbon-nitrogen and nitrogen-nitrogen bridges. At least one five- or six-membered heteroaromatic ring is preferably present, alone, or is part of a fused ring system, which heteroaromatic ring contains at least one heteroatom selected from O, N, S, Se or Te. The number or size of the fused ring systems should not be so large as to interfere with the compatibility of the NLO compounds in the polyimide host matrix.

In accordance with one aspect of the process of the present invention, the polyamic acid composition, and, consequently, the polyimide composition intramolecularly condensed therefrom, is a blend of an NLO guest compound in the host polymer matrix. In yet another aspect of the process of the present invention, pendant side chains of the NLO guest compounds are covalently bonded to the polyamic acid, and, consequently, the polyimide polymer matrix. The polyamic acid and polyimide have one or more monomeric subunits with reactive groups through which the NLO compound is covalently attached. The polymers preferably contain a plurality of monomeric subunits with the reactive groups through which the NLO compound is covalently attached, so that the ratio of the monomeric subunits having reactive groups covalently linked to an NLO compound to monomeric subunits without an NLO compound covalently attached thereto is between 1:99 and about 75:25.

In yet another aspect of the process of the present invention, the host polyamic acid polymer matrix is cross-linked by the NLO guest compounds before the intramolecular condensation of the polyamic acid to the polyimide. Alternatively, the polyamic acid may be independently cross-linked to form the host polymer matrix for the NLO guest compounds before the intramolecular condensation of the polyamic acid to form the polyimide.

As noted above, the polyimide compositions produced by the lower temperature process of the present invention possess unique birefringence properties, which are an advantage in the subsequent dipole alignment of the NLO compounds contained therein, providing enhanced stability to the aligned composition. Therefore, in accordance with the present invention, polyimide host matrix compositions are provided, formed by the process of the present invention and containing a guest NLO compound. Preferred NLO compounds have the structure of Formula I in which D, R and A are the same as described above with respect to Formula I.

As a result of the reduced optical attenuation and improved dipole alignment stability, the polyimide compositions of the present invention possess enhanced electro-optic coefficients compared to state of the art polyimide compositions containing NLO compounds. In addition, the reduced domain formation enhances the mechanical properties of the polyimide compositions. Furthermore, polyimide compositions suitable for use in electro-optic devices can be prepared from commercially available polyamic acids having well-known and understood chemical properties.

DETAILED DESCRIPTION OF THE PREFERRED EMBODIMENT

The NLO compound-containing polyimide compositions prepared by the process of the present invention, once suitably oriented, exhibit a high second order NLO susceptibility. The polyimide compositions are formed from precursor compositions of polyamic acids containing the NLO compounds. The polyamic acids are converted to polyimides in a ring-closing reaction accomplished by a thermally induced intramolecular condensation. This is performed by uniformly heating the polyamic acid in a solid-state reaction, that is, in the absence of solvent or diluent, to a temperature between about 120° C.–190° C.

The lower temperature solid-state, solvent-free reaction conditions, made possible by uniformly heating the thermally resistive polyamic acid compositions, prevents the development of circumstances that would otherwise degrade the NLO compounds contained therein. In addition, the lower temperature conditions provide birefringence properties to the resulting polyimides, advantageous to the subsequent dipole alignment of the NLO compounds.

The NLO compounds contained in the polyamic acid compositions used in the process of the present invention, and consequently the polyimide compositions produced thereby, have a structure represented by Formula I in which D, R and A form a non-centrosymmetric delocalized resonance configuration, in which D is an electron donating moiety, A is an electron withdrawing moiety, and R is a pi-conjugated electron delocalized aromatic ring-containing moiety.

R can be any pi-conjugated electron delocalized aromatic ring-containing moiety exhibiting optical nonlinearity when ring-substituted with electron donating and electron accepting moieties, which ring-containing moieties can be readily identified by those of ordinary skill in the art without undue experimentation. Suitable pi-conjugated electron delocalized aromatic ring-containing moieties contain from one to ten aromatic rings or fused ring systems. Two or more rings or fused ring systems are linked together to form a pi-conjugated electron delocalized resonance configuration.

Within the present specification, "heteroaromatic" rings are defined as being limited to aromatic heterocyclic rings, thereby excluding carbocyclic rings such as phenyl groups. "Aromatic" rings are defined as generically including carbocyclic and heterocyclic rings. The heteroaromatic rings of the present invention contain one or more heteroatoms selected from O, N, S, Se and Te.

The pi-conjugated electron delocalized aromatic ring-containing moieties of the present invention preferably contain from one to four aromatic rings or fused ring systems. The aromatic rings or fused ring systems within each organic moiety may be the same or different.

For aromatic ring-containing moieties having multiple rings or fused ring systems, it is preferable that at least one ring alone, or within a fused ring system, be a five-membered heteroaromatic ring having one heteroatom selected from O, N, S, Se and Te. The heteroaromatic rings may optionally include up to three additional N atoms. Preferably, the five-membered heteroaromatic rings possess a structure corresponding to Formula II:

(II)

in which Y is C or N and X is selected from O, N, S, Se and Te.

Preferably, the aromatic ring-containing moieties having multiple rings or fused ring systems contain two or more of the five-membered heteroaromatic rings, alone, or as part of a fused ring system. Most preferably, all of the rings are five-membered heteroaromatic rings, and all fused ring systems contain a five-membered heteroaromatic ring. When two or more heteroaromatic rings are present, the rings may have the same or different heteroatoms.

The fused ring systems should not be so large as to hinder the compatibility of the NLO guest compounds in the polyimide host matrix. The point at which fused ring system size interferes with polyimide compatibility is easily identified by those of ordinary skill in the art. Fused ring systems of two to three rings are preferred, and three ring systems are most preferred.

For pi-conjugated electron delocalized aromatic ring-containing moieties having multiple rings or fused ring systems, adjacent rings or fused ring systems may be linked by from one to three pi-electron conjugated electron delocalized functional groups such as carbon-carbon, carbon-nitrogen or nitrogen-nitrogen functional groups. Preferably, the adjacent rings or fused ring systems are bridged by one or two of the conjugated functional groups. When adjacent rings or fused ring systems are bridged by two or three functional groups, the conjugated functional groups may be the same or different than the conjugated functional groups between adjacent rings or fused ring systems and may vary within an NLO compound. When the ring is heteroaromatic, or the fused ring system contains a heteroaromatic ring, the linkage is preferably substituted on the ring alpha to a heteroatom. For six-membered rings, alone, or within fused ring systems, the linkage is substituted para to another linkage, an electron donating group, or an electron acceptor group.

The use of pi-conjugated electron delocalized functional groups to bridge adjacent rings or fused ring systems in NLO compounds is essentially conventional to the art of NLO active organic materials. Examples of suitable ring- or fused ring system-bridging functional groups known in the art include, but are not limited to, —CH=CH—, —N=N—, —CH=N—, —CH=N—N=CH—, —C≡C—, and (CH=CH—)$_j$, with j two or three. The adjacent rings or fused ring systems may also be covalently bonded to directly link the rings or fused ring systems without forming a fused structure.

The pi-conjugated electron delocalized aromatic ring-containing moieties of the present invention can also include a single aromatic ring or fused ring system. The preferred single ring is a five-membered heteroaromatic ring as defined above. Fused rings are preferred over single rings, and fused ring systems containing at least one five-membered heteroaromatic ring, as defined above are preferred fused ring systems.

Regardless of whether the pi-conjugated aromatic ring-containing moiety has single or multiple rings or fused ring systems, the fused ring systems suitable for use in the present invention contain two or three rings. The two- or three-ring fused ring systems can consist entirely of five-membered heteroaromatic rings.

The configuration of multiple heteroaromatic rings within a fused ring system is not critical, and may be an all "up" configuration or an alternating "up" and "down" configuration, as depicted in the above-cited U.S. patent application Ser. No. 07/930,732. The two or three five-membered heteroaromatic rings may have the same or different heteroatoms.

The fused ring systems of the present invention are not limited to structures containing five-membered heteroaromatic rings. Fused ring systems containing benzene rings, pyridine rings, and the like, and combinations thereof are also suitable for use with the present invention. When a two- or three-ring system includes pyridine, the pyridine should not be quaternized. Such ionic species cause severe current leakage during the dipole-alignment electric field poling process.

From the foregoing description, the aromatic and fused ring systems represented by R as being suitable for use with the present invention can be easily identified by those of ordinary skill in the art. Suitable rings and ring systems include, but are not limited to, pyrrole, furan, thiophene, imidazole, oxazole, thioazole, triazole, tetrazole, pyrazole, pyrimidine, pyridine, purine, quinolines, carbazole, benzene, naphthalene, furazan, pyrazine, indole, isoindole, indazole, phenothiazine, benzotriazole, anthracene, phenanthrene, azophenanthrenes, quinazolines, pteridine, pyrones, chromones, and the like.

Non-centrosymmetric electron delocalized aromatic NLO compounds suitable for use with the present invention also include compounds having structures corresponding to Formula IA, wherein $A_1$ and $A_2$, $D_1$ and $D_2$ and $R_1$ and $R_2$ may be the same or different, and are selected from the same moieties described above with regard to A, D and R, respectively, with the proviso that one of $D_1$ and $D_2$ may be hydrogen, and that the compound formed by $A_1$, $A_2$, $D_1$, $D_2$, $R_1$ and $R_2$ possesses a delocalized resonance configuration. The NLO compounds of Formula IA are described in copending and commonly-owned U.S. patent application Ser. No. 08/101,368, filed Aug. 2, 1993, the disclosure of which is hereby incorporated herein by reference thereto.

To induce charge asymmetry, the pi-conjugated, electron delocalized aromatic ring-containing moiety is ring-substituted with an electron donating group and an electron accepting or withdrawing group. Thus, A in Formula I, and $A_1$ and $A_2$ in Formula IA, represent electron accepting groups, and electron donating groups are depicted as D in Formula I and $D_1$ and $D_2$ in Formula IA.

Electron donating and electron accepting groups are preferably substituted on five-membered heterocyclic rings that are either single rings or members of fused ring systems, although this is not essential. When substituted on heteroaromatic rings, the electron donating group or electron accepting group is preferably substituted alpha to a heteroatom. For pi-conjugated, electron delocalized aromatic ring-containing moieties containing multiple rings or fused ring systems, the electron donating and electron accepting groups are preferably attached to aromatic or heteroaromatic rings or fused ring systems at opposite ends of the multiple ring structure. For single fused ring systems, the electron donating and accepting groups are substituted to ring members of different rings.

The electron donating groups and electron accepting groups are substituted to the aromatic ring-containing moiety so as to form an electron delocalized resonance configuration. Positions for substituting electron donating and electron accepting groups to form electron delocalized resonance configurations can be readily determined by those of ordinary skill in the art. Examples of typical delocalized resonance configurations are depicted in the above-cited U.S. patent application Ser. No. 930,732.

The electron donating and accepting groups that are capable of inducing charge asymmetry to aromatic ring-containing moieties are essentially conventional to the art of NLO active organic materials. Any functional group capable of withdrawing electrons from a pi-conjugated, electron delocalized ring system is suitable for use as an electron accepting group. Examples of suitable electron accepting groups known in the art include —$NO_2$, —CN, —CHO, —$COR_3$, —$COOR_3$, —$PO(OR_3)_2$, —$SO_2R_3$, —$SO_3R_3$, —$PO(R_3)_2$, dicyanovinylpyrones and —CX=CYZ, wherein X, Y and Z are independently selected from hydrogen, —CN, —$NO_2$, —$COR_3$, —$COOR_3$, —$SO_2R_3$, —$PO(R_3)_2$ and —$PO(OR_3)_2$. $R_3$ is an alkyl group containing up to 15 carbon atoms, and preferably is a methyl group. Other suitable electron accepting groups include N,N-dialkylbarbituric acids, N,N-dialkylthiobarbituric acids, N,N-diarylbarbituric acid, N,N-diarylthio-barbituric acid, rhodanines, hydrantoins, oxazolines, and a ring system having a structure corresponding to Formula III:

wherein $X_1$ and $X_2$ form a saturated or unsaturated five- to eight-membered cyclic ring or two-ring system having five- to eight-membered rings, and $X_3$ and $X_4$ are independently selected from $SO_2$ and:

wherein $X_5$ is independently selected from O, S and $Cl_1I_2$, wherein $I_1$ and $I_2$ are independently selected from —CN, —$NO_2$, —$COR_3$, —$COOR_3$, —$SO_2R_3$, —$PO(R_3)_2$, —$PO(OR_3)_2$. Again, $R_3$ is an alkyl group containing up to 15 carbon atoms, and preferably is a methyl group. Examples of ring structures defined by the structure of Formula III include 3-dicyanovinylindane-1-sulfone, 1,3-bis-sulfonylindane, indane-1,3-dione, 3-dicyanovinylindane-1-one and 1,3-bisdicyanovinylindane.

Strong electron accepting groups are preferred, examples of which include —C(CN)=C(CN)$_2$, —$NO_2$, dicyanoethylene, dinitroethylene, cyanonitroethylene, nitroesterethylene, N,N-dialkylbarbituric acids, N,N-dialkylthiobarbituric acids and the group having the structure depicted in Formula IV, wherein $X_1$, $X_2$, $X_3$ and $X_4$ and $I_1$ and $I_2$ are the same as described above with respect to the structure. The most preferred strong electron accepting group is —C(CN)=C(CN)$_2$, a tricyanoethylene or tricyanovinyl group. Guidance for the selection of electron withdrawing moieties can be found in Nicoud et al., Ch. II–III of *Nonlinear Optical Properties of Organic Molecules and Crystals*, Vol. 1 (Chemla and Zyss, Eds., Academic Press, Inc., New York 1987), p.233.

Essentially any functional group capable of releasing electrons into the pi-electron system of an electron delocalized aromatic or heteroaromatic ring or fused ring system is suitable for use as an electron donating group. Electron donating groups that are used to induce charge asymmetry to the structure of Formula I are also essentially conventional to the art of NLO active organic materials. Guidance for the selection of electron donating groups can also be found in Nicoud et al.

Examples of suitable electron donating groups known in the art include —$NR_6R_7$—, —$OR_8$—, —$SR_8$—, —$TeR_8$—, —$SeR_8$—, CH=$NR_9$—, —CH=N—$NR_6R_7$— and —CH=C[N($R_6R_7$)]$_2$—, wherein $R_6$ and $R_7$ are independently selected from hydrogen, alkyl groups containing up to 12 carbon atoms and groups derived from functionalized alkyl groups containing up to 12 carbon atoms through which the electron donating group is covalently linked to the polyamic acid or polyimide. The alkyl groups are functionalized with nucleophilic substituents, examples of which include alkoxy, aminoalkyl, alkylhalide, hydroxyalkyl, alkylsulfide, alkylisocyanate, alkylisothiocyanate, alkylthiol, alkylazide, alkylcarboxylic, alkylsulfonic, alkylalkene and alkylalkyne groups. $R_6$ and $R_7$ may also together form a cyclic group containing up to eight carbon atoms, including groups such as pyrrolidine, piperidine, piperazine and morpholine.

$R_8$ is selected from hydrogen, alkyl groups containing up to six carbon atoms and alkyl groups functionalized with nucleophilic substituents containing up to six carbon atoms. $R_9$ is selected from hydrogen, alkyl groups containing up to ten carbon atoms and alkyl groups functionalized with nucleophilic substituents containing up to ten carbon atoms. The nucleophilic substituent functionalized alkyl groups of $R_8$ and $R_9$ are functionalized with the nucleophilic substituents described above with respect to $R_6$ and $R_7$.

Another example of suitable electron donating groups is depicted by the structure of Formula IV:

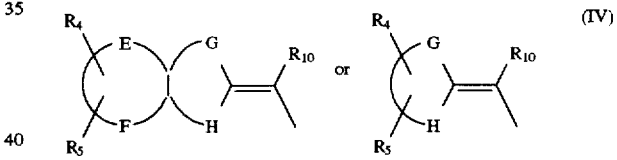

wherein E, F, G and H are members of a saturated or unsaturated five- to eight-membered cyclic ring or two-ring system having five- to eight-membered rings that are electron donating in nature. E, F, G and H are —CH—, —$CH_2$—, or heteroatoms independently selected from O, N, S, Se, Te and —$NR_{11}$—. $R_4$, $R_5$, $R_{10}$ and $R_{11}$ are independently selected from hydrogen, alkyl groups containing up to 18 carbon atoms and alkyl groups functionalized with nucleophilic substituents containing up to 18 carbon atoms. The nucleophilic substituent functionalized alkyl groups are the same as described above with respect to $R_6$ and $R_7$.

Examples of suitable one- or two-ring electron donating groups include dithiane and dithiolium groups such as 1,3-dithiolium, 2-benzo-1,3-dithiolium and 2-ethylenedithio-1,3-dithiolium, and the like. Whether or not a ring is electron donating in nature to meet the definition of membership in the groups is understood by those of ordinary skill in the art.

Strong electron donating groups are preferred, which significantly increase the second order NLO properties of the composition of the invention. Examples of strong electron donating groups are —$NR_6R_7$, and groups such as pyrrolidine, dithiane, piperidine, piperazine, morpholine and the above dithiolium groups. The most preferred strong electron donating group is a 2-ethylenedithio-1,3-dithiolium group.

The aromatic or heteroaromatic rings or fused ring systems of the NLO compounds of the present invention may optionally be further substituted. Any number of functional groups can be substituted on the aromatic or heteroaromatic ring or rings, provided that the groups are not so large or so numerous to cause undesirable steric hindrance effects, the occurrence of which will be clear to those of ordinary skill in the art.

The preferred embodiment of the present invention includes a second electron donating group, or a second electron accepting group, or both, attached to the same rings, or ring members of fused rings systems, as the respective first electron donating group and the first electron accepting group described above, so that all of the electron donating and electron accepting groups present, together with the pi-conjugated aromatic ring-containing moiety, form an electron delocalized non-centrosymmetric resonance configuration. The second electron donating or accepting group may be the same or different than the corresponding first electron donating or accepting group. The inclusion of a second electron donating or electron accepting group increases the second order NLO properties of the resulting material as compared to materials having single-substitution of electron donating and electron accepting groups.

The NLO compounds of the present invention are prepared by well-known methods widely reported in the prior art. The preparation of many of these moieties is disclosed in the above-cited U.S. patent application Ser. Nos. 66,358 and 930,732. Some of the pi-conjugated electron delocalized aromatic ring-containing moieties are commercially available. The electron accepting groups and electron donating groups can be substituted to the aromatic ring-containing moiety using conventional methods.

The polyamic acids of the present invention are formed by the reaction of either an aromatic diamine with a bis-(aromatic dicarboxylic acid anhydride), or by the reaction of a bis-(aromatic dicarboxylic acid anhydride) with an aromatic diamine.

The aromatic dicarboxylic acid anhydrides from which the bis-(acid anhydrides) of the present invention are derived include phthalic anhydride, trimellitic anhydride, naphthalene anhydride, and the like. Examples of bis-(aromatic dicarboxylic acid anhydrides) include:

3,3',4,4'-benzopheninetetracarboxylic dianhydride pyromellitic dianhydride
3,3',4,4'biphenyltetracarboxylic dianhydride (3,4-dicarboxyphenyl)hexafluropropane dianhydride
4,4'-oxydiphthalic anhydride
3,3',4,4'-diphenylsulfonetetracarboxylic dianhydride
5-(2,5-dioxotetrahydrol)-3-methyl-3-cyclohexane-1,2-dicarboxylic anhydride,
ethylene glycol bis(anhydrio-trimellitate)

Aromatic diamines suitable for use in the preparation of polyamic acids from which polyimides may be derived are well-known to those of ordinary skill in the art. The aromatic diamine may be selected to fine-tune the $T_g$ of the polymer. For example, aromatic diamines providing polyimides with a more rigid structure include:

2,4-toluene diamine
p-phenyldiamine
2,2-bis(3-amino-4-methylphenyl)-hexafluoropropane
2,2'-bis(4-aminophenyl)hexafluropropane
3,3'-dihydroxy-4,4'-diaminobiphenyl
3,3'-dimethyl-4,4'-diaminobiphenyl
2,5-diaminobenzotrifluoride
1,4-bis(4-aminophenoxyl)benzene
1,3-bis(4-aminophenoxyl)biphenyl
4,4'-oxydianiline
3,4'-oxydianiline
3,3'-diaminodiphenylsulfone
4,4'-diaminodiphenylsulfone
9,10-bis(4-aminophenyl)anthracene
O-tolidine sulfone
9,9-bis(4-aminophenyl)fluorene
4,4'-diaminodiphenyl sulfide Aromatic diamines that provide polyimides with a softer, less rigid, more amorphous structure include Bisaniline P, Bisaniline M, bis-(4-[4-aminophenoxy]phenyl)ether, tetramethylphenylmethylene diamine, diethylmethylene diamine, and the like.

Polyamic acids suitable for use in the present invention are liquid polymers having an intrinsic viscosity at room temperature between about 1,500 and about 35,000 centipose (cP) as measured with a Brookfield viscometer. Preferred polyamic acids have an intrinsic viscosity between about 2,000 and about 25,000 cP, and particularly preferred polyamic acids have an intrinsic viscosity between about 4,000 and about 15,000 cP. Many commercially available polyamic acids are suitable for use with the present invention including Ultradel 4212, Ultradel 9020D and Ultradel 3112, available from the AMOCO Chemical Company of Chicago, Ill.; and W100, W160, W200, L100, L2200 and W170, available from the Hitachi Chemical Company of Japan.

In one embodiment of the present invention, a nonlinear optical medium may be formed as a blend of the NLO compounds of the present invention with a polyimide derived from the above-described polyamic acids. Typically, the NLO compounds are blended with the polyamic acids, and consequently, the polyimides, at a level between about 1 and about 50 weight percent, and preferably between about 5 and about 30 weight percent. The NLO compounds of the present invention may simply be dissolved in polyamic acid solutions, which are spin-coated to form polyamic acid films. Following solvent removal, the polyamic acid films are cured to form polyimide film matrices containing the NLO compounds.

The polyamic acids are typically dissolved in a higher boiling point polar solvent such as N-methyl pyrrolidone (NMP), dimethylacetamide (DMAC), dimethylformamide (DMF), and the like, at levels between about 5 and about 30 weight percent and preferably between about 10 and about 20 weight percent. The NLO compounds are therefore dissolved in the solvents at levels between about 1 and about 50 weight percent, and preferably between about 5 and about 30 weight percent, based on the weight of the polyamic acid. Alternatively, the polyamic acids can be polymerized in the presence of the NLO compounds of the present invention so that a host polymer matrix is formed within which the NLO compound is present as a guest molecule.

The NLO compounds of the present invention can also be covalently attached as side chains to the polyamic acids, and consequently, the polyimides. The NLO compounds may be directly attached as side chains to a polymerized polyamic acid. Ring substitution of the polyamic acid is obtained by using polyamic acids derived from monomers substituted with moieties capable of undergoing nucleophilic substitution, so that the polyamic acid is substituted with same. Such moieties are readily identified by those of ordinary skill in the art, with a preferred moiety being acid chlorides.

The polyamic acid is then reacted with an NLO compound having a structure represented by Formula I in which R and A are the same as described above with respect to Formula I and D is an electron donating group functionalized with a nucleophilic substituent. The means by which the polyamic acid may be substituted with the above-described NLO compounds are well-known and essentially convention to those of ordinary skill in the art. The NLO compounds of Formula IA may be similarly reacted, wherein either or both of $D_1$ and $D_2$ are electron donating groups functionalized with a nucleophilic substituent.

Thus, the electron donating groups may be one of the above-described electron donating groups in which $R_6$ or $R_7$ includes an alkyl group functionalized with a nucleophilic substituent and containing up to 12 carbon atoms, $R_8$ is a functionalized alkyl group containing up to 6 carbon atoms, $R_9$ is a functionalized alkyl group containing up to 10 carbon atoms, or at least one of $R_4$, $R_5$, $R_{10}$ and $R_{11}$ of the structure of Formula IV is a functionalized alkyl group containing up to 18 carbon atoms.

In the alternative, the NLO compounds may first be covalently attached as side chains of a polyamic acid monomer which is then copolymerized with monomer having no NLO side chain to form a polyamic acid having NLO side chains. The NLO polymers are then recovered and purified by conventional means well known to those of ordinary skill in the art.

Thus, the bis-(aromatic dicarboxylic acid anhydrides) from which the polyamic acids of the present invention are derived may have ring-substituted NLO side chains. Ring substitution of the bis-(aromatic dicarboxylic acid anhydride) is obtained by using a bis-(aromatic dicarboxylic acid anhydride) in which an aromatic ring of either or both aromatic dicarboxylic acid anhydride is substituted with a moiety capable of undergoing nucleophilic substitution.

The bis-(aromatic dicarboxylic acid anhydride) is then reacted with an NLO compound having a structure represented by Formula I in which R and A are the same as described above with respect to Formula I and D is an electron donating group functionalized with a nucleophilic substituent. The means by which the bis-(aromatic dicarboxylic acid anhydrides) may be ring-substituted with the above-described NLO compounds are well-known and essentially conventional to those of ordinary skill in the art. Again, the NLO compounds of Formula IA may be similarly reacted, with either or both of $D_1$ and $D_2$ being electron donating groups functionalized with nucleophilic substituents.

The NLO side chains of the bis-(aromatic dicarboxylic acid anhydrides) need not be ring-substituted. Side chain substitution at a position other than an aromatic ring is obtained by using a bis-(aromatic dicarboxylic acid anhydride) having a non-aromatic moiety, which is substituted with a moiety capable of undergoing nucleophilic substitution. The bis-(acid anhydride) is then reacted with the above-described NLO compound having an electron donating group functionalized with a nucleophilic substituent. Again, the means by which the bis-(acid anhydrides) may be side-chain substituted with the above-described NLO compounds are well-known and essentially conventional to those of ordinary skill in the art.

Preferably, the bis-(aromatic dicarboxylic acid anhydrides) are prepared by linking together two aromatic dicarboxylic acid anhydrides with an NLO compound. Examples of suitable aromatic dicarboxylic acid anhydride starting materials include phthalic anhydride, trimellitic anhydride acid chloride, 1,8-naphthalic anhydride, and the like, which are substituted with a moiety capable of undergoing nucleophilic substitution. The acid anhydrides are reacted with an NLO compound having the structure of Formula I or Formula IA, containing either two electron donating moieties, or one electron donating moiety with two nucleophilic substituents. A bis-(aromatic dicarboxylic acid anhydride) is obtained having an NLO side chain.

Accordingly, the electron donating group may be one of the above-described electron donating groups that are functionalized with two nucleophilic substituents, such as $-NR_6R_7$, $-CH=N-NR_6R_7$ and $-CH=C[N(R_6R_7)]_2$. For the above-described electron donating groups, $R_6$ and $R_7$ may also together form one of the listed cyclic groups containing up to 8 carbon atoms, provided that the cyclic group is functionalized with two nucleophilic substituents. The electron donating group may also include the structure of Formula IV in which at least two of $R_4$, $R_5$, $R_{10}$ and $R_{11}$ contain nucleophilic substituents.

The reaction is performed at a temperature between about $-10°$ and about $25°$ C. in an aprotic solvent. Examples of suitable aprotic solvents include halogenated hydrocarbons such as methylene chloride, chloroform, chlorobenzene, and the like. The NLO side chain substituted bis-(aromatic dicarboxylic acid anhydride) is then worked up by conventional methods involving extraction with water, drying and solvent washing, with a 1:1 ratio of methylene chloride and hexane being preferred.

NLO side chain substituted aromatic diamines may be similarly prepared. That is, ring-substituted aromatic diamines are prepared from aromatic diamines that are ring-substituted with moieties capable of undergoing nucleophilic substitution, and aromatic diamines having non-aromatic moieties that are substituted with moieties capable of undergoing nucleophilic substitution. Either compound is then reacted with the compound having the structure of Formula I or Formula IA in which the electron donating group is functionalized with a nucleophilic substituent. Again, the means by which the aromatic diamine may be substituted with the above-described NLO compounds are well-known and essentially conventional to those of ordinary skill in the art.

Preferably, the aromatic diamines are formed by reacting aromatic amines with an NLO compound. Examples of suitable aromatic amine starting materials include, aniline, 2-, 3- or 4-aminophenol, and the like, which are substituted with a moiety capable of undergoing nucleophilic substitution and reacted with an NLO compound having an electron donating group containing two leaving groups, so that an aromatic diamine is obtained having an NLO side chain.

Two moles of the aromatic amine may be reacted with one mole of the NLO compound, to form an aromatic diamine in which two aromatic amines are linked by an NLO side chain. The NLO compound again contains either two electron donating groups or one of the above-described electron donating groups containing two nucleophilic substituents.

Aromatic diamines having an NLO side chain may also be prepared by reacting one mole of an aromatic amine substituted with a moiety capable of undergoing nucleophilic substitution with one mole of an NLO compound having an electron donating moiety containing two amine substituents. One of the amines functions to attach the NLO compound as a side chain to the aromatic amine, while the other amine functions as the second amine of the diamine.

The aromatic amines and NLO compounds are reacted in a polar solvent, such as DMF, DMSO, NMP, at a temperature ranging between about $0°$ and about $50°$ C. The NLO side chain substituted aromatic diamine is then worked up by conventional methods involving extraction with dichloromethane, drying, evaporating and solvent washing, with an ice-cooled alcohol being preferred.

The bis-(aromatic dicarboxylic acid anhydride) and the aromatic diamine are then copolymerized in a 1:1 ratio to form the polyamic acid of the present invention. Either the bis-(acid anhydride), the aromatic diamine, or both, may contain an NLO side chain. Both bis-(acid anhydrides) and aromatic diamines having no NLO side chains may be included in the reaction mixture.

Thus, it will be appreciated that the polyamic acids of the present invention need not be completely substituted with NLO groups. The present invention includes polymers having ratios of NLO substituted monomeric subunits to unsubstituted monomeric subunits between about 1:99 and about 75:25.

Therefore, the present invention includes polyamic acids derived from the reaction of NLO compound-substituted bis-(aromatic dicarboxylic acid anhydride) with NLO compound substituted aromatic diamines. Substitution ratios between about 10:90 and about 70:30 are preferred. Substitution ratios less than about 60:40 are more preferred in order that the polymer remains soluble in spin casting solvents. The most preferred substitution ratio is about 50:50. The same ratios are also applicable to polyamic acids prepared by directly attaching NLO compounds as side chains to polymerized polyamic acids. That is, each monomeric subunit of a polymerized polyamic acid will not be substituted with moieties capable of undergoing nucleophilic substitution.

The polymerization of the polyamic acid of the present invention is essentially conventional and is readily understood by those of ordinary skill in the art. The polymerization is performed in a common solvent for the reagents, typically a higher boiling point polar solvent such as NMP, DMAC, DMSO and the like.

Once the reaction is complete, the polyamic acid having NLO side chains is precipitated with a lower alkyl alcohol, such as methanol or isopropanol, filtered and dried under vacuum. The polymer can then be further purified by conventional methods, typically by repeated dissolution and reprecipitation from the lower alkyl alcohol. The preferred polyamic acids and polyimides of the present invention typically have weight-average molecular weights between about 2,500 and about 50,000 daltons measured by gel permeation chromatography.

Films of the polyamic acid-NLO compound combinations of the present invention may be formed by spin-coating solvent-based solutions of the polymer, after which the solvent is removed by oven drying at temperatures preferably between about 80° C. and about 100° C. The polyamic acid film is coated on a suitable substrate, typically a silicon wafer, indium tin oxide glass, and the like. Spin-coating of polymer films containing NLO compounds is essentially conventional and disclosed in U.S. Pat. No. 4,935,292, the disclosure of which is hereby incorporated herein by reference thereto. A film thickness between about 1 and about 10 microns is preferred, with a three micron film thickness being most preferred.

In accordance with the present invention, the cyclization of the polyamic acid to the polyimide is accomplished by uniformly heating the polyamic acid film in the absence of a solvent or diluent to thermally induce an intramolecular condensation at a temperature between about 120° C. to about 190° C. As noted above, the uniform heating under solid-state solvent-free reaction conditions results in a lower temperature condensation reaction, thereby preventing the degradation of the NLO compounds. The uniform heating at lower temperatures results in polyimide compositions having unique birefringence properties, useful in the subsequent dipole alignment of the NLO compounds.

Preferred processes in accordance with the present invention uniformly heat the polyamic acid composition by irradiating the composition with electromagnetic radiation in the microwave or radio frequency range. The dielectric heating produced by the electromagnetic radiation allows for extremely fine control of the polymer molecular alignment, and thus the free volume, of the resulting polyimide.

The frequency of the electromagnetic radiation used in the microwave or radio frequencies ranges from $10^8$ to $10^{11}$ Hertz (Hz). The electromagnetic radiation may be pulsed or continuous. The input power is selected to provide the desired heating rate. The preferred output power is up to about 1–2 kilowatts.

When using pulsed radiation, any arrangement of pulse duration and pulse repetition frequency which allows for the dissipation of adverse heat buildup in the intramolecularly condensing polyamic acid may be used in the present invention. The pulse duration may be varied from 1 to 100 microseconds and the pulse repetition frequency from 2 to 1000 pulses per second. The polyamic acid composition may be irradiated for any period of time sufficient to achieve the intramolecular condensation. Generally, a film will be irradiated for at least about 5 minutes, and commonly for a period of time ranging from about 15 minutes to about 60 minutes to achieve the desired extent of condensation. The time required to achieve the condensation will be shorter for higher power settings.

When continuous radiation is utilized, the sample is heated for a time sufficient to achieve the desired intramolecular condensation, generally about 15 minutes, preferably about 10 to about 30 minutes. As with pulsed radiation, the time, frequency and power input can be routinely adjusted to achieve the desired extent of condensation.

Typically, continuous radiation is first employed to attain the desired intramolecular condensation temperature, after which, pulsed radiation is employed to maintain the desired temperature. Accordingly, the duration of continuous radiation, pulse radiation duration, and radiation frequency can be readily adjusted by one having ordinary skill in the art to achieve the desired extent of condensation based on simple calibration experiments. The extent of conversion of the polyamic acid to the corresponding polyimide may be confirmed by conventional analytical techniques, such as Fouier Transform Infra-Red Spectrophotometry (FT-IR).

The optimum condensation temperature may also be determined by simple calibration experiments. As noted above, the intramolecular condensation is thermally induced at a temperature between about 120° C. to about 190° C. A temperature between about 150° C. and about 180° C. is preferred. The condensation reaction generates water, which readily evaporates during the irradiation of polymer films up to 20 microns thick. For bulk condensation processes, the decreased surface to volume ratio will require that steps be taken to ensure complete removal of the water that evolves. However, this is also a routine matter that may be addressed by techniques such as extending the irradiation time, venting the irradiation cavity, applying a vacuum to the irradiated polymer, and the like, or combinations thereof.

Irradiation of the polyamic acid sample may be conducted in any microwave and/or radio frequency heating device which is capable of continuous or pulsed radiation and has the power requirements necessary to thermally induce the intramolecular condensation of the sample. Suitable heating devices include microwave ovens, wave guides, resonant cavities, and the like. Suitable heating devices are well known in the art and commercially available.

The preferred device for performance of the present invention is a single-mode resonant cavity. Any available mode for heating in this device can be used in the present invention. However, the present invention is not to be limited to use of this device but can be performed in any microwave or radio frequency heating equipment.

In general, the process of the present invention is carried out by placing the polyamic acid inside of a microwave or radio frequency device and applying the appropriate input power. The present invention may be applied as either a batch or continuous process.

The present invention incorporates the discovery that the temperature at which the intramolecular condensation is thermally induced may be selected to optimize the birefringence of the resulting polyimide. Light behaves as a transverse wave in which the waves vibrate perpendicular to the direction of propagation. Birefringence is the splitting of a light wave by an optical material into two components, the ordinary ray and the extraordinary ray, which travel at different velocities and are polarized at right angles to each other. In other words, a birefringent material has separate indices of refraction for the two components, which results in their separation and travel at different velocities in the medium.

The ordinary ray follows the path expected of a light wave in a non-birefringent material, with the extraordinary ray diverging therefrom at a different velocity as a function of the difference between the two indices of refraction, which difference is expressed as the index of birefringence. The index of birefringence is obtained by subtracting the index of refraction for the ordinary ray from the index of refraction for the extraordinary ray.

The refractive indicies, and consequently birefringence, are determined by the prism-coupling measurement method described by Nishihari et al., *Optical Integrated Circuits* (McGraw 1985) Section 8.2.2, the disclosure which is incorporated herein by reference. The process of the present invention controllably and reproducably provides polyimides with inherently low indices of birefringence, typically less than 0.2. The free volume of the molecular alignment of the polyimide is an inverse function of the index of birefringence, that is, the lower the index value, the greater the free volume. To minimize the index of birefringence for a given polyimide, that is, to maximize the free volume, the condensation temperature should be kept to a minimum. That is, to maximize the free volume, the condensation temperature should be kept as low as possible. As will be explained in greater detail below, the object is to attain the optimum index of birefringence and corresponding free volume of the polymer for use with the molecular rotational volume of the NLO compound to be employed. A free volume should be selected that will shrink below the molecular rotational volume of the NLO compounds upon densification following dipole alignment, yet will be greater than, or at least expand to greater than, the molecular rotational volume prior to densification, so that the individual NLO compound molecules are free to rotate for dipole alignment.

Thus, the largest possible or smallest possible index of birefringence may not be most desirable for a given polyimide. Instead, the optimum index of birefringence will include a range of values capable of allowing molecular rotation of a given NLO compound prior to densification and then capable of densifying below the molecular rotational volume following dipole alignment.

The molecular rotational volumes of NLO compounds vary with the compound structure. Accordingly, the optimum range for the index of birefringence of a given polyimide will vary as a function of the NLO compound structure.

The molecular rotational volume of NLO compounds is expressed in cubic angstroms and corresponds to the molecular weight of the compound. Commercially feasible NLO compounds vary in molecular weight from about 100 to about 2,000 daltons. This corresponds to a molecular rotational volume between about 250 and about 3,000 cubic angstroms. The optimum range of index of birefringence for given ranges of molecular rotational volumes is set forth below in Table I:

TABLE I

| P.I. THERMAL CURE TEMPERATURE (BPDA - PDA) | BIREFRINGENCE (Δn) | CAVITY RADIUS OF GYRATION (ANGSTROMS) |
|---|---|---|
| 120° | .02 | >30 |
| 180° | .12 | 15 |
| 220° | .16 | 8 |
| 300° | .18 | 4 |
| 360° | .2 | 3 |

The determination of molecular rotational volume in cubic angstroms is a function of the volume of each atom in a given NLO compound, the interatomic distances and the individual bond angles. This calculation is essentially conventional and may be readily performed by one of ordinary skill in the art by building molecular models or using a standard computer program. From the molecular model, the long axis is measured and the radius of gyration about the center point determined. For the NLO molecules this will coincide with the dipole moment direction.

Accordingly, the molecular rotational volume of a given NLO compound may be calculated and matched with a polyimide having the optimum free volume for the given molecular rotational volume. The free volume of a given polyimide can be readily adjusted by one having ordinary skill in the art by varying the intramolecular condensation temperature as described above to achieve the desired free volume as determined by the index of birefringence. As will be appreciated, the adjustment of the index of birefringence of the polyimide is also based on simple calibration experiments to determine the intramolecular condensation temperature that will produce the desired index of birefringence and corresponding polymer free volume. This is readily performed by one of ordinary skill in the art without undue experimentation.

The purpose of matching an NLO compound with a polyimide having the optimum free volume for the molecular rotational volume of the NLO compound is to enhance the thermal stability of dipole-aligned NLO compounds in the polyimide polymer matrix by a dipole-alignment process referred to as densification poling. Densification poling is essentially a two-step process in which the NLO compound dipoles are aligned by application of an intense electric field (0.1–2.0 MV cm$^{-1}$) during a rapid thermal ramp, followed by densification of the polyimide at an elevated temperature. Densification poling requires the matching of the NLO compound with a polyimide having a free volume which permits the free rotation of individual NLO compound molecules within the polyimide matrix during the dipole alignment step, but which subsequently densifies to a free volume less than that of the molecular rotational volume of the individual NLO compound molecules, so that the densification, or contraction, of the polymer locks the aligned dipoles of the NLO compound molecules into place, thereby stabilizing the aligned system.

The imidization reaction converts the flexible polyamic acid chain to a more rigid polyimide chain. The low temperature imidization by microwave produces rigid polymer chains that are not tightly packed. The thermal energy produces the high packing density.

Densification poling is performed upon polyimide films. Therefore, polyimide compositions that were intramolecularly condensed from polyamic acids in bulk must first be spin-coated on a suitable substrate following the procedure described above with respect to polyamic acids, as disclosed in U.S. Pat. No. 4,935,292, followed by solvent removal by heating in an oven at a temperature between 80° C. and 100° C. until substantially all the solvent has been removed, about 1 minute.

Densification poling may be performed upon polyimide composition films immediately after the intramolecular condensation from the polyamic acid. Alternatively, the polyimide composition films may first be cooled and stored for extended periods of time prior to densification poling.

Densification poling of the polyimide composition films is performed by heating the films by a rapid thermal ramp to a temperature above the densification temperature. The densification temperature for polyimides is typically above 310° C. Above this temperature there is little farther change in total index (average of the two separate indices) or in birefringence. This occurs because there is little reduction in free volume, or increase in density. Polyimides suitable for use with the present invention typically have a densification temperature between about 300° C. and about 340° C. The NLO compound dipoles are aligned by application of an intense electric field (0.2–1.0 MV cm$^{-1}$) during the rapid thermal ramp. At first, thermal expansion of the polymer material increases the free volume, permitting the individual NLO compound molecules to rotate into dipole alignment. The polyimide composition film is then held above the densification temperature for a specified time after the polymer molecules align, during which the free volume of the material contracts.

Typically, from about 0.1 to about 20 minutes are required for dipole alignment. The rate of heating of the rapid thermal ramp is selected to permit dipole alignment before the densification temperature is attained. In general, a rate of heating between about 5° C. per minute and about 60° C. per minute would allow for acceptable polymer alignment before densification of the polymer. A rate of heating between about 20° C. per minute and about 40° C. per minute is optimum for dipole alignment.

The temperature to which the polyimide composition film is heated in excess of the densification temperature will depend upon the extent of densification required to lock the dipole-aligned NLO compound molecules in the polyimide polymer matrix. Higher temperatures are required for polyimides having free volumes greatly in excess of the molecular rotational volumes of the NLO compound molecule. Of course, the polyimide film should not be heated to a temperature at which thermal degradation of the NLO compound will occur. For this reason, it is preferred that densification poling be performed with uniform heating of the polyimide composition film so that the temperature differential within the polyimide is below that which will produce localized thermal degradation temperatures. More preferably, the uniform heating is performed by irradiating the film with electromagnetic radiation in the microwave or radio frequency range by the procedures described above with respect to the intramolecular condensation of polyamic acids.

In the context of dipole alignment stability, the polyimide polymer matrix cannot be over-densified. Therefore, in general, the polyimide composition should be heated to the highest temperature above the densification temperature that will not thermally degrade the NLO compound or densify the polyimide to the extent that too great an index of birefringence is produced. Accordingly, the polyimide composition film should be heated to a temperature between the densification temperature of the polymer and the thermal degradation temperature of the NLO compound effective to provide a polyimide composition having an acceptable index of birefringence.

Following densification poling, the index of birefringence of the polyimide composition film should not exceed 0.3, and preferably, it should not exceed 0.2. As noted above, the adjustment of the index of birefringence of the polyimide is based on simple calibration experiments to determine the temperature that will produce the desired index of birefringence. This is readily performed by one of ordinary skill in the art without undue experimentation.

If a lower temperature is required to maintain a low index of birefringence, a longer densification time may be needed to insure complete densification of the polymer to stabilize the dipole alignment of the individual NLO compound molecules. Typically, the polyimide composition films will be held at the temperature above the polymer densification temperature for at least 0.5 minutes, and preferably up to about 20 minutes. A heating time between about 5 and about 10 minutes is preferred, although lower temperatures closer to the actual densification temperature may require longer heating times.

The application of the dipole-aligning electric field should be continued until the available free volume of a polyimide is reduced below the molecular rotational volume of the NLO compound in order to maintain the stability of the dipole alignment until the contraction of the, polyimide locks the aligned NLO compounds into the polyimide matrix. Preferably, the application of the electric field is maintained until the polymer film has cooled to room temperature to insure the densification is complete.

It is disclosed in U.S. Pat. No. 4,932,292 and SPIE Proceeding No. 1147, 74–83 (1989) that further stabilization of the dipole alignment of the NLO compound can be achieved by a radiation-induced or chemical-induced crosslinking of the polymer matrix. This process is also essentially conventional, and the disclosure of which in U.S. Pat. No. 4,935,292 is also hereby incorporated herein by reference thereto.

The electro-optic coefficient of an NLO-active poled polymer film is proportional to the product of the molecular second order nonlinear optical susceptibility coefficient β, and the molecular ground state electric dipole moment, μ. The molecular β is dependent upon the frequency at which the measurement is performed because of the resonance effect near the absorption peek. A method to compare molecules with different absorption properties by extrapolation of the β value measured at a specific frequency to zero frequency using a two-level model is disclosed by Singer, *J. Opt. Soc. Am.*, B6, 1339–50 (1989). The β value at the extrapolated frequency is defined $β_0$. The NLO-active compounds of the present invention can exhibit values of the $β_0μ$ product as high as about 10,000 in units of $10^{-48}$ esu measured at a wavelength of 1907 nm.

Thus, it can be appreciated that the present invention provides an improved method by which NLO compositions based on desirable polyimides may be formed from commercially available polyamic acids with minimal thermal degradation of the NLO compounds contained therein. The process unexpectedly produces a polyimide with reduced densification, which provides a means by which the stability of the NLO compound molecules in the polyimide polymer matrix upon dipole alignment may be improved. The improved stability of the dipole alignment reduces domain formation and the optical attenuation associated therewith. Consequently, the polyimide compositions of the present invention possess enhanced electro-optic coefficients compared to state-of-the-art polyimide NLO compositions.

The following examples further illustrate the present invention, and are not to be construed as limiting the scope thereof. All parts and percentages are by weight unless expressly indicated to be otherwise, and all temperatures are in degrees Celsius.

The microwave heating was performed utilizing a 7 inch diameter single-mode tuneable cavity purchased from Wavemat, Inc. of Plymouth, Mich. The microwave unit consists of a variable power unit which operates at a frequency of 2.45 GHz, with a maximum output power of 40 watts and a programmable temperature controller. Using this set up, it is possible to perform both constant power heating, monitoring the temperature as a function of time, and isothermal heating by pulsing the microwave power through the use of a controlled loop feedback sequence. When needed, the temperature is monitored using a LUXTRON 755 fluorooptic system.

Samples were placed in the cavity so that the $TM_{012}$ mode was utilized. The temperature of the film was measured by directly placing the luxtron temperature probe on its surface. All of the microwave experiments were performed with continuous microwave energy until the isothermal temperature was reached, at which time pulsing of the microwave power was performed to maintain the temperature.

EXAMPLES

Example I

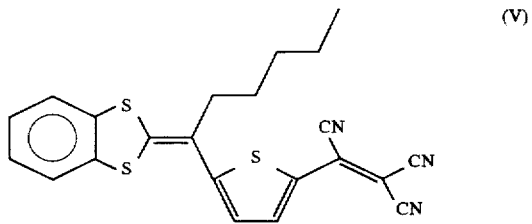
(V)

A polyamic acid solution containing an NLO compound was prepared by dissolving the NLO compound in a 15 percent by weight solution of a polyamic acid, Hitachi L2200, using N-methyl pyrrolidone as the solvent. The NLO compound of Formula V, 2-hexyl-thienyl-6-ylidene-[2'-(1', 3'-benzodi-thiole)]-tricyanovinyl was dissolved in this solution at a level of ten percent based upon the weight of polyamic acid. The polyamic acid and NLO compound were dissolved in the N-methyl pyrrolidone with continuous mixing at room temperature for four hours.

The 2-hexyl-thienyl-6-ylidene-[2'-(1',3'-benzodithiole)]-tricyanovinyl was prepared by adding potassium t-butoxide (1.12 g, 10.0 mmol) to a −78° C. stirred solution of 2-hexanoyl thiophene (10.0 mmol) and 2-diethoxy phosphoryl-1,3-benzodithiole (2.9 g, 10.0 mmol), in dry, freshly distilled tetrahydrofuran (25 mL) under an argon atmosphere. The resulting solution was stirred and slowly warmed to room temperature overnight under an argon atmosphere. The mixture was concentrated in vacuo, and the residue was dissolved in dichloromethane, washed with water (3×200 mL), dried ($Na_2SO_4$), and concentrated onto approximately 5.0 g silica. This silica was added to a medium pressure column packed with silica. The column was eluted with a 3:1 ratio solution of hexane to dichloromethane with a gradient to 1:1 to yield the substituted thiophene (2.36 g, 90% yield).

Tricyanovinylation of the substituted thiophene was accomplished by gradually adding (approx. 5–10 min.) tetracyanoethylene (1.0 equiv.) to a stirred solution of the substituted thiophene in 25 mL dimethylformamide at 0° C. under an argon atmosphere. The reaction mixture was slowly warmed to room temperature overnight and then poured into 100 mL water and extracted with dichloromethane (2×200 mL). The dichloromethane layers were combined, dried ($Na_2SO_4$), concentrated in vacuo and chromatographed (silica) on a medium pressure column. The column was eluted with a 2:1 ratio of hexane to dichloromethane to yield the tricyano compound (80% yield).

The 2-hexanoyl thiophene was prepared by dissolving thiophene (0.9 g, 10.7 mmol) and hexanoyl chloride (1.52 g, 11.3 mmol), both of which were obtained from Aldrich Chemical Supply and used without further purification, in benzene (20 mL). The solution was cooled to 0° C. under argon. Stannic chloride (10.7 mL, 10.7 mmol, 1M solution in dichloromethane) was added dropwise and the resulting solution was stirred overnight. The next day, 20 mL of a 50:50 mixture of concentrated hydrochloric acid and water was added. The resulting mixture was stirred for two hours whereupon the color became golden yellow. The organic layer was separated, washed with sodium bicarbonate solution, dried ($Na_2SO_4$) and concentrated to yield 2-hexanoyl thiophene (94% yield). The compound was further purified by column chromatography using hexane/dichloromethane as the elutant.

The 2-diethoxy phosphoryl-1,3-benzodithiole was prepared as described in J. Org. Chem., 39, 2457 (1974).

A three micron film of the polyamic acid/NLO compound mixture was formed on a 2.5 cm×2.5 cm silicon wafer by spin-coating the above polyamic acid/NLO compound solution. The film-coated wafers were then soft dried in an oven at 100° C. to remove any residual N-methyl pyrrolidone.

Each film-coated wafer was placed one at a time in the cavity of the microwave unit. The film samples were irradiated with continuous microwave energy for 10 minutes to attain a preselected intramolecular condensation temperature of 160° C. The actual average temperature attained was 156° C.

After the microwave radiation, the film samples were cooled and removed from the microwave cavity. FT-IR confirmed the imidization to be about 95 percent complete. The polyimide composition film had an index of birefringence of 0.0041, as determined by the above-mentioned prism-coupling method. Essentially no thermal decomposition of the NLO compound occurred.

Five of the microwave-heated film coated wafers were then heated in an oven for 20 minutes at 350° C. The films were then cooled and the index of birefringence was measured for each film. Following the high temperature thermal treatment, the polyimide composition film had an index of birefringence of 0.0043.

Five film coated wafers were not microwave treated, but instead were heated in an oven for 20 minutes at 350° C. without microwave heating. After cooling, the index of birefringence for these films was determined to be 0.0071.

Example 2

Five polyamic acid film coated wafers were prepared as in Example 1. The film samples were irradiated with microwave energy as in Example 1, but for 25 minutes. Birefringence measurements were taken, and the samples were then heated in an oven for 20 minutes at 350° C. as in Example 1, followed by birefringence measurements for purposes of comparison.

After microwave heating, but before oven heating, the polyimide composition film had an index of birefringence of 0.0040. After the oven heating, the index of birefringence was 0.0047.

Example 3

Three polyamic acid film coated wafers were prepared as in Example 1 and divided into three groups that were microwave cured at 170° C., 180° C. and 190° C., respectively, for 15 minutes. The actual average temperatures obtained were 166° C., 176° C. and 183° C., respectively. As in Examples 1 and 2, birefringence measurements were taken after microwave heating, followed by thermal heating for 20 minutes at 350° C., after which additional birefringence measurements were taken for purposes of comparison. The results are depicted below in Table II:

TABLE II

| TEMPERATURE | BIREFRINGENCE | |
|---|---|---|
| | Microwave Cure | With Oven Cure |
| 170° C. | 0.0032 | N/A |
| 180° C. | 0.0043 | 0.0029 |
| 190° C. | 0.0047 | 0.0053 |

Example 4

The procedure of Examples 1-3 were repeated using polyamic acid L100 from Hitachi. These samples were divided into five groups, four of which were microwave heated at 160° C., 10 minutes, 160° C., 25 minutes, 180° C., 15 minutes, and 190° C., 15 minutes, respectively. The actual average temperatures obtained were 155° C., 157° C., 177° C. and 183° C. Birefringence measurements were taken for each sample, which were then heated for 20 minutes in an oven at 350° C., then cooled. Birefringence measurements were taken again for purposes of comparison. The fifth sample was a control sample that was heated in an oven at 350° C. for 20 minutes without microwave heating. The birefringence of this sample was determined to be 0.2283. The birefringence data for the other samples is listed below in Table III:

TABLE III

| TEMPERATURE | BIREFRINGENCE | |
|---|---|---|
| | Microwave Cure | With Oven Cure |
| 160° C. (10 min.) | 0.0650 | 0.2257 |
| 160° C. (25 min.) | 0.1518 | 0.2357 |
| 180° C. | 0.1179 | 0.2130 |
| 190° C. | 0.1851 | 0.2342 |

The microwave heated material is less dense, with a greater excess free volume, than the oven heated material. This is indicated by the lower birefringence of the microwave heated films. At least in the case of the polyimide formed from polyamic acid 2200, the excess free volume seems to be "locked" in even after subsequent oven treatment. That is, oven heating of a microwave heated sample did not significantly increase the index of birefringence, compared to the index of birefringence of a material that was oven heated at the same temperature for the same length of time, but without prior microwave heating. For both polyimides, there was a significant difference in the index of birefringence of materials that were microwave heated, compared to the control samples that were only heated in an oven without microwave heating.

The foregoing examples and description of the preferred embodiment should be taken as illustrating, rather than limiting, the present invention as defined by the claims. As will be readily appreciated, numerous variations and combinations of the features set forth above can be utilized without departing from the present invention as set forth in the claims. All such modifications are intended to be included within the scope of the following claims.

What is claimed is:

1. A process for intramolecularly condensing a polyamic acid composition containing a nonlinear optical (NLO) compound to form a polyimide host matrix composition containing as a guest the NLO compound, wherein said NLO compound has the structure:

D—R—A wherein D, R and A form a non-centrosymmetric electron delocalized resonance configuration in which R is a pi-conjugated electron delocalized aromatic ring-containing moiety, A is an electron withdrawing moiety substituted on a ring of R, and D is an electron donating moiety substituted on a ring of R, which process comprises the step of:

irradiating said polyamic acid composition with electromagnetic radiation in the microwave or radio frequency range, in the absence of a solvent or a diluent, so that said polyamic acid composition is uniformly heated to a temperature at which said intramolecular condensation will occur without thermal degradation of said NLO compound, and the temperature differential within said polyamic acid is below that which will produce localized thermal degradation temperatures, until said intramolecular condensation of said polyamic acid composition to said polyimide host matrix composition is substantially complete.

2. The process of claim 1, wherein said composition is irradiated with pulsed electromagnetic radiation.

3. The process of claim 1, wherein said composition is irradiated with continuous electromagnetic radiation.

4. The process of claim 1, wherein said composition is irradiated with continuous electromagnetic radiation to heat said composition to said intramolecular condensation temperature, after which said composition is irradiated with pulsed electromagnetic radiation to maintain said temperature until said intramolecular condensation of said composition to said polyimide host matrix composition is substantially complete.

5. The process of claim 1, wherein said intramolecular condensation temperature is between about 120° C. and about 190° C.

6. The process of claim 5, wherein said intramolecular condensation temperature is between about 150° C. and about 180° C.

7. The process of claim 1, wherein said process further includes the steps of:

casting a film of said polyimide host matrix composition on an NLO substrate, after said intramolecular condensation of said polyamic acid composition to said polyimide host matrix composition is substantially complete;

heating said film to a temperature above the densification temperature of said polyimide host matrix composition while an electric field of intensity sufficient to align the dipoles of said NLO compound molecules is applied to said polyimide host matrix composition film, wherein the rate of heating of said polyimide host matrix composition film to a temperature above said densification temperature of said polyimide host matrix composition is selected to allow said dipoles of said NLO compound molecules to become substantially aligned before said densification temperature of said polyimide host matrix composition is attained; and maintaining the temperature of said polyimide host matrix composition film above said densification temperature of said polyimide host matrix composition at least until the available free volume of said polyimide host matrix composition is reduced below the molecular rotational volume of the NLO compound molecules.

8. The process of claim 7, wherein said densification temperature of said polyimide host matrix composition is between about 300° C. and about 340° C.

9. The process of claim 8, wherein said step of heating said polyimide host matrix composition film to a temperature above said densification temperature of said polyimide host matrix composition comprises heating said polyimide host matrix composition film to a temperature above about 310° C.

10. The process of claim 7, wherein said rate of heating of said polyimide host matrix composition film to a temperature above the densification temperature of said polyimide host matrix composition is at a rate between about 5° C. and about 60° C. per minute.

11. The process of claim 10, wherein said rate of heating of said polyimide host matrix composition film to a temperature above said densification temperature of said polyimide host matrix composition is at a rate between about 20° C. and about 400° C. per minute.

12. The process of claim 7, wherein said step of heating said polyimide host matrix composition film to a temperature above said densification temperature of said polyimide host matrix composition comprises the step of uniformly heating said polyimide host matrix composition film so that the temperature differential within the polyimide host matrix composition is below that which will produce localized thermal degradation temperatures.

13. The process of claim 12, wherein said step of uniformly heating said polyimide host matrix composition film comprises the step of irradiating said polyimide host matrix composition film with the electromagnetic radiation in the microwave or radio frequency range.

14. The process of claim 12, wherein said step of uniformly heating said polyimide host matrix composition film comprises the step of irradiating said film with electromagnetic radiation in the frequency range from $10^8$ to $10^{11}$ Hz.

15. The process of claim 13, wherein said polyimide host matrix composition film is irradiated with pulsed electromagnetic radiation.

16. The process of claim 13, wherein said polyimide host matrix composition film is irradiated with continuous electromagnetic radiation.

17. The process of claim 7, further comprising the step of cooling said polyimide host matrix composition film to room temperature after said available free volume of said polyimide host matrix composition is reduced below said molecular rotational volume of said NLO compound molecules.

18. The process of claim 17, wherein said application of said electric field is discontinued after said available free volume of said polyimide host matrix composition is reduced below said molecular rotational volume of said NLO compound molecules.

19. The process of claim 17, further comprising the step of maintaining said application of said electric field until said polyimide host matrix composition film has cooled to room temperature.

20. A process for intramolecularly condensing a polyamic acid composition containing a nonlinear optical (NLO) compound to form a polyimide host matrix composition containing as a guest the NLO compound, wherein said NLO compound has the structure:

wherein D, R and A form a non-centrosymmetric electron delocalized resonance configuration in which R is a pi-conjugated electron delocalized aromatic ring-containing moiety, A is an electron withdrawing moiety substituted on a ring of R and D is an electron donating moiety substituted on a ring of R, said process comprising the step of:

irradiating said polyamic acid composition with electromagnetic radiation in the frequency range from $10^8$ to $10^{11}$ Hz, in the absence of a solvent or a diluent, so that said polyamic acid composition is uniformly heated to a temperature at which said intramolecular condensation will occur without thermal degradation of said NLO compound, and the temperature differential within said polyamic acid is below that which will produce localized thermal degradation temperatures, until said intramolecular condensation of said polyamic acid composition to said polyimide host matrix composition is substantially complete.

21. A polyimide host matrix composition containing a guest NLO compound, prepared by the method of claim 1.

22. The composition of claim 21, comprising a blend of said guest NLO compound in said host polyimide.

23. The composition of claim 22, wherein said NLO compound is present at a level between about 1 and about 50 weight percent.

24. The composition of claim 21, wherein said NLO compound is covalently linked to monomeric subunits of said polyimide.

25. The composition of claim 24, wherein said polyimide comprises a plurality of monomeric subunits covalently linked to an NLO compound molecule via said electron donating group of said NLO compound, so that the ratio of said monomeric subunits covalently linked to an NLO compound molecule to monomeric subunits without an NLO compound molecule covalently linked thereto is between about 1:99 and about 75:25.

26. The composition of claim 25, wherein said ratio is about 50:50.

27. The composition of claim 21, comprising a polyimide with an index of birefringence less than about 0.2.

28. The composition of claim 21, wherein said polyimide has a weight-average molecular weight between about 2,500 and about 50,000 daltons measured by gel permeation chromatography.

29. A polyimide host matrix composition containing a guest NLO compound, prepared by the method of claim 7, wherein said NLO compound has an external field-induced molecular alignment.

* * * * *

UNITED STATES PATENT AND TRADEMARK OFFICE
CERTIFICATE OF CORRECTION

PATENT NO. : 5,736,592
DATED : April 7, 1998
INVENTOR(S) : DeMeuse et al.

It is certified that error appears in the above-identified patent and that said Letters Patent is hereby corrected as shown below:

Column 1, line 42, "$P=\alpha E + \beta E^2 + \gamma E^3 +$" should read -- $P=\alpha E+\beta E^2+\gamma E^3+\ldots$ --.

Column 7, line 59, "with j two or three" should read --with j being two or three--.

Column 25, line 37 (last line of claim 11), "400°C." should read --40°C.--.

Signed and Sealed this

Twenty-first Day of July, 1998

Attest:

BRUCE LEHMAN

*Attesting Officer*     *Commissioner of Patents and Trademarks*